United States Patent Office 3,306,504
Patented Feb. 28, 1967

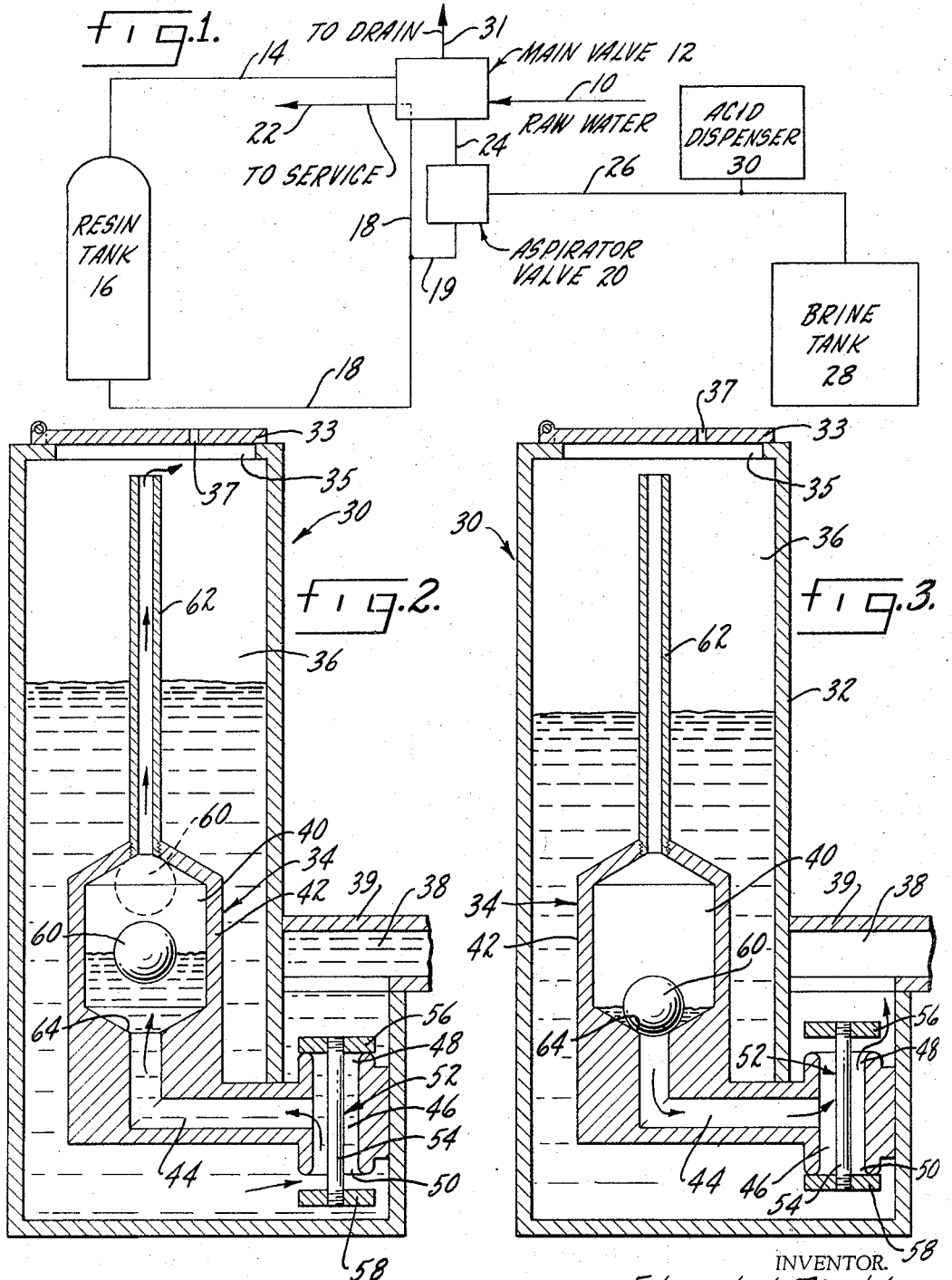

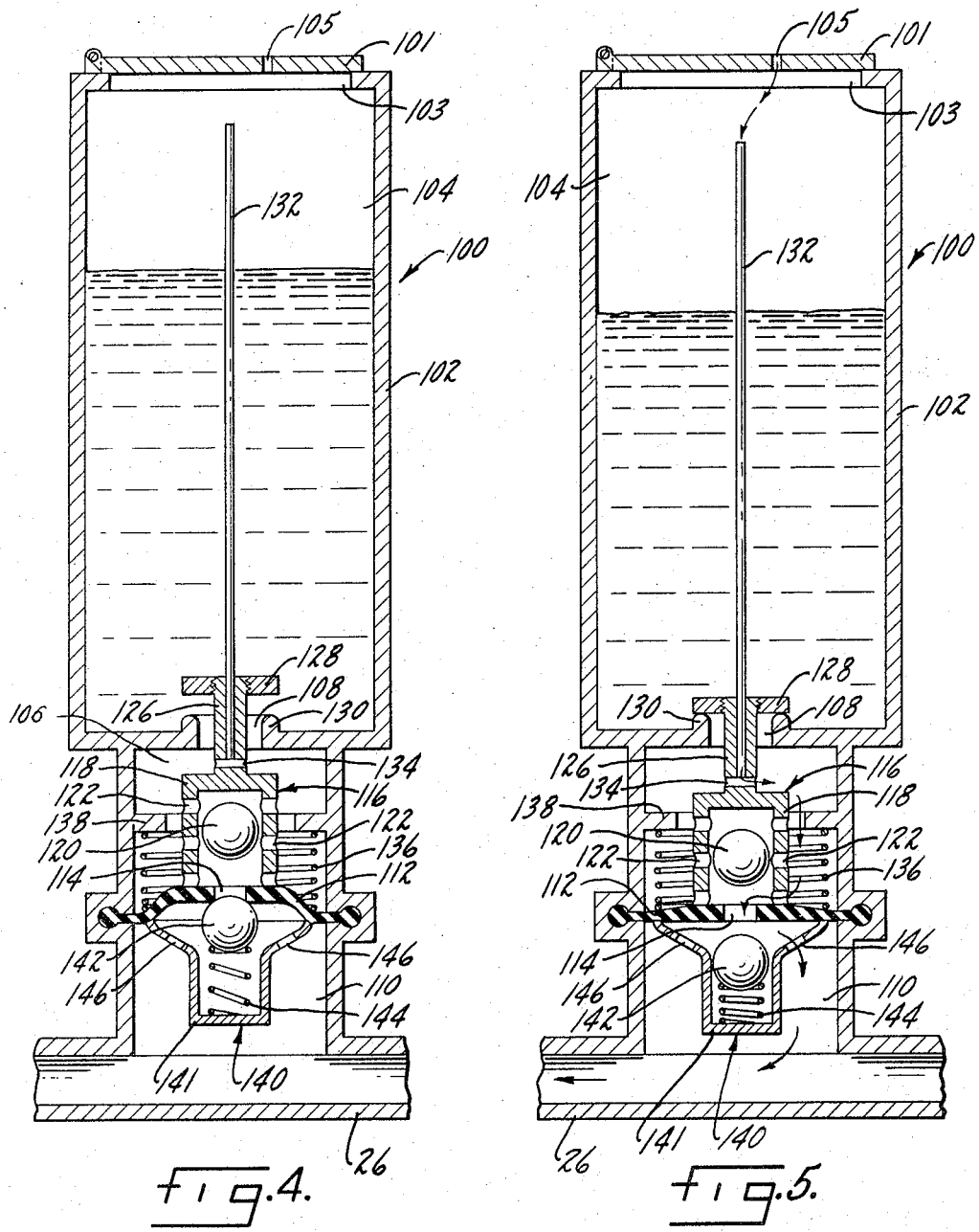

3,306,504
WATER CONDITIONING SYSTEM
Edward J. Tischler, St. Paul, Minn., assignor to Union Tank Car Company, Chicago, Ill., a corporation of Illinois
Filed June 5, 1963, Ser. No. 285,751
6 Claims. (Cl. 222—442)

This invention relates to means for dispensing a liquid and, more particularly, to an acid dispenser suitable for use in a water softening system.

Water softening with ion exchange resin particles is well known in the art. After prolonged contact of the ion exchange resin particles with raw water during the service cycle, these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride. More recently, it has been found that improved regeneration of the ion exchange resin particles is achieved by contacting the resin particles with an aqueous acid solution, such as citric acid or the like, and the brine solution. The sequential process may be employed wherein the resin particles are contacted first with the acid solution and then the brine solution. Likewise, the resin particles may be simultaneously contacted with the acid solution and the brine solution. These processes are discussed in detail in copending application Serial No. 170,043, filed January 31, 1962, and assigned to the assignee of the present application. In any event, such processes require means to dispense the aqueous acid solution which is to be contacted with the resin particles during the regeneration cycle.

Accordingly, it is an object of the present invention to provide a means for dispensing a liquid.

It is another object of the present invention to provide a means for dispensing a predetermined amount of liquid.

It is a further object of the present invention to provide a liquid dispenser adapted to dispense a predetermined amount of a liquid to a line, the liquid dispenser being actuated by the pressure in the line.

It is still another object of the present invention to provide means for dispensing a predetermined amount of an aqueous acid solution.

These and other objects more apparent hereinafter are realized by the liquid dispenser embodying the features of the present invention. The liquid dispenser is adapted to dispense a predetermined amount of liquid to a line to which it is attached. The pressure in the line actuates the liquid dispenser.

The invention, both as to its organization and method of operation, taken with further objects and advantages thereof, will be understood by reference to the following description taken in conjunction with the accompanying drawings, in which:

FIGURE 1 is a schematic diagram of a water softening system wherein water is treated with ion exchange resin particles which are regenerated by an acid solution and a brine solution, the acid solution being supplied from an acid dispenser embodying the features of the present invention;

FIGURE 2 is a cross-sectional view of the acid dispenser shown in FIGURE 1 as a metering chamber in the acid dispenser is being filled with acid solution;

FIGURE 3 is a cross-sectional view of the acid dispenser of FIGURE 1 after acid solution has been dispensed from the metering chamber to the ion exchange resin particles;

FIGURE 4 is a cross-sectional view of a modified acid dispenser embodying the features of the present invention as a metering chamber in the acid dispenser is being filled with acid solution; and FIGURE 5 is a cross-sectional view of the modified acid dispenser of FIGURE 4 as acid solution is being dispensed from the metering chamber to the ion exchange resin particles.

Referring to the drawings, and more particularly to FIGURE 1, there is schematically illustrated a water softening system for treating water with ion exchange resin particles. Suitable ion exchange resin particles are well known in the art and do not constitute a part of the present invention. In this system the ion exchange resin particles, when they become exhausted, are regenerated sequentially with an acid solution and a brine solution.

During the service cycle, raw water from a suitable source is passed through a feed line 10 to a main valve indicated generally by reference numeral 12. The main valve 12 directs the raw water through a line 14 to a resin tank 16 which contains a bed of the ion exchange resin particles as is well known in the art. The raw water passes through the bed of ion exchange resin particles and is withdrawn from the tank 16 through a line 18. The treated water, which has been softened by contact with the ion exchange resin particles, passes through the line 18 to the main valve 12 which diverts it to a service line 22. There is, of course, no mixing of the treated water with the raw water in the main valve 12.

After a predetermined quantity of raw water has passed through the resin tank 16, the ion exchange resin particles lose their capacity to effectively soften the raw water and must be regenerated. This is effected by sequentially contacting the exhausted resin particles with an acid solution and a brine solution. The regeneration cycle is initiated by actuating the main valve 12 so that a portion of the raw water from the line 10 is directed to the service line 22. In this manner, a supply of water is maintained to the service line 22 during the regeneration cycle. The remainder of the raw water is directed by the main valve 12 through a line 24 into an aspirator valve 20. As the raw water passes through the aspirator valve 20 in this direction a partial vacuum, i.e., a pressure less than atmospheric pressure, is created therein and in a line 26 which communicates with the aspirator valve 20, a brine tank 28 and an acid dispenser 30 embodying the features of the present invention. By virtue of the partial vacuum created in the line 26, a predetermined amount of acid solution is drawn from the acid dispenser 30 and brine solution is drawn from the brine tank 28. The acid solution and brine solution pass sequentially through the line 26 into the aspirator valve 20 and through a line 19 to the line 18 and into the tank 16. Suitable valve means (not shown) prevent acid solution and brine solution from passing directly from the line 18 into the main valve 12. After passing upwardly through the bed of resin particles in the tank 16, and thereby regenerating the resin particles, the acid solution and brine solution are passed to drain through a line 31 after passing through the line 14 and the main valve 12. The main valve 12 prevents the raw water from mixing with the brine solution and acid solution. Likewise, the acid and brine solutions cannot enter the service line 22.

When regeneration of the resin particles in the tank 16 is complete, the regeneration cycle is terminated by actuating the main valve 12 so that the raw water passes through the line 14, the tank 16, the line 18, the main valve 12, and the service line 22, as discussed hereinbefore. During the service cycle some of the treated water passes through the line 19 and the aspirator valve 20 to the line 26 to supply make-up water to the brine tank 28, as is well known in the art. The line 26 has suitable valve means (not shown) in the brine tank 28 to automatically terminate the flow of make-up water to the brine tank 28 after sufficient make-up water has been added thereto. Valve means for this purpose are well known in the art and do not constitute a part of the present invention. The make-up water dissolves solid sodium chloride or the like in the brine tank 28 to form the brine solution utilized in the next regeneration cycle.

As will be more fully explained hereinafter, the high pressure (greater than atmospheric pressure) of the treated water in the line 26 causes the acid dispenser 30 to meter another predetermined amount of acid solution during the service cycle so that the acid dispenser 30 is ready to discharge this acid solution to the line 26 during the regeneration cycle. The partial vacuum or low pressure in the line 26 during the regeneration cycle actuates the acid dispenser 30 whereupon it dispenses the predetermined amount of acid solution which has been metered during the service cycle.

The main valve 12 does not constitute a part of the present invention and suitable valves for this purpose are well known in the art, e.g., the main valve disclosed in United States Patent No. 2,999,514, assigned to the assignee of the present application. Another suitable valve is disclosed in copending application Serial No. 190,995, filed April 30, 1962, now Patent No. 3,215,273, and assigned to the assignee of the present application. Similarly, suitable aspirator valves 20 are well known in the art. However, it is preferred in this system to employ an aspirator valve of the type disclosed in copending applications Serial No. 170,043, filed January 31, 1962, now abandoned, and Serial No. 191,767, filed May 2, 1962, now Patent No. 3,185,302, which are assigned to the assignee of the present application. The system may, of course, be operated manually, automatically or semi-automatically by suitable means (not shown) which do not constitute a part of the present invention.

Referring to FIGURES 2 and 3, the acid dispenser 30 embodying the features of the present invention will be discussed in detail. The acid dispenser 30 comprises an acid container 32 and a metering device indicated generally by reference numeral 34. The acid container 32 has a pivotally mounted lid 33 adapted to open and close an opening 35 in the top of the container 32. The acid container 32 forms an acid reservoir chamber 36 which communicates with the atmosphere through a vent passageway 37 in the lid 33. A relatively large supply of an aqueous acid solution, such as citric acid or the like, is in the reservoir chamber 36, as shown in FIGURES 2 and 3. The acid dispenser 30 is connected to the line 26 by a pipe 39 having a passageway 38 therein and is adapted to dispense a predetermined amount of acid solution to the line 28 through the passageway 39 in a manner more apparent hereinafter.

The metering device 34 is adapted to receive from the reservoir chamber 36 a predetermined amount of acid solution and dispense this acid solution to the passageway 38 and the line 26 during the regeneration cycle. To these ends, the metering device 34 comprises a body member 42 forming a metering chamber 40 and passageways 44 and 46. The passageway 44 connects the passageway 46 with the metering chamber 40. The passageway 46 connects the passageway 38 and the reservoir chamber 36 with the passageway 44. Acid solution passes from the reservoir chamber 36 to the metering chamber 40 through the passageways 46 and 44 and from the metering chamber 40 to the passageway 38 and the line 26 through the passageways 44 and 46. The passageway 46 has ports 48 and 50 at its ends. The port 48 provides communication between the passageway 46 and the passageway 38, while the port 50 allows communication between the passageway 46 and the reservoir chamber 36.

The metering device 34 includes a valve means, indicated generally by reference numeral 52, which is adapted to open and close the ports 48 and 50. The valve means 52 comprises a valve stem member 54 which extends through the passageway 46 and has a first valve closure member 56 attached to one end and a second valve closure member 58 attached to the other end. The valve stem 54 is a rod-shaped member made, in this instance, of metal and has threaded ends. The valve closure members 56 and 58 are annular-shaped members made, in this instance, of metal and have their central openings threaded for attachment to the valve stem 58. The valve closure member 56 is adapted to open and close the port 48 while the valve closure member 58 is adapted to open and close the port 50. The valve stem 54 is of sufficient length so that the port 48 is open when the valve closure member 58 closes the port 50 and the port 50 is open when the valve closure member 56 closes the port 48. As will be seen in FIGURES 2 and 3, the valve means 52 may move laterally within the passageway 46 and the ports 48 and 50. However, the size of the passageway 46 and the ports 48 and 50 relative to the size of the valve closure members 56 and 58 and the valve stem 54 is such that when the valve means 52 is actuated during the service cycle the port 48 is closed and when it is actuated during the regeneration cycle the port 50 is closed, regardless of lateral movement of the valve means 52.

The metering chamber 40 has a floatable ball valve 60 therein made of suitable plastic material or the like, which is adapted to float on the acid solution in the metering chamber 40. A vent tube 62, which is threadedly attached, or otherwise suitably secured, to the body member 42, communicates with the metering chamber 40 and extends upwardly to the top portion of the reservoir chamber 36. The vent tube 62 is adapted to vent air displaced from the metering chamber 40 as it is being filled with acid solution from the reservoir chamber 36. The floatable ball valve 60 closes the vent tube 62 when the metering chamber 40 has been substantially filled with acid solution. In addition, the ball valve 60 is adapted to close the passageway 44 by seating on a valve seat 64 when substantially all of the acid solution has been discharged from the metering chamber 40 during the regeneration cycle.

Assuming that the water softening system is in its service cycle, the line 26 will be placed under a high pressure by virtue of the treated water therein. The treated water under high pressure will pass into the passageway 38 and, by virtue of the force it creates on the valve closure member 56, cause the valve means 52 to move to the position shown in FIGURE 2. In this position the valve closure member 56 closes the port 48 while the valve closure member 58 opens the port 50. Accordingly, acid solution will flow by the force of gravity from the reservoir chamber 36 through the port 50, the passageway 46, and the passageway 44 into the metering chamber 40. The floatable ball valve 60, which had been seated on the valve seat 64, will rise in the metering chamber 40 with the level of the acid solution. The air displaced from the metering chamber 40 as acid solution enters will be vented through the vent tube 62 to the reservoir chamber 36. The flow of acid solution in this manner continues until the floatable ball valve 60 closes the vent tube 62, as shown in dotted lines in FIGURE 2, which occurs when the metering chamber 40 is substantially filled with acid solution. The acid dispenser 30 is now ready to discharge a predetermined amount of acid solution to the line 26.

When the resin particles are ready for regeneration, the regeneration cycle is initiated and the line 26 placed under a partial vacuum or low pressure as described hereinbefore. Accordingly, the passageway 38 is likewise placed under a low pressure or partial vacuum. By virtue of the pressure differential between the metering chamber 40 and the pressure in the passageway 38, the valve means 52 will be moved to the position shown in FIG- URE 3. In this position the valve closure member 58 closes the port 50 and the valve closure member 56 opens the port 48. Acid solution is drawn from the metering chamber 40 through the passageways 44 and 46 and the port 48 to the passageway 38. The acid solution passes from the passageway 38 to the line 26 and the resin tank 16. This flow of acid solution continues until the floatable ball valve 60 seats upon the valve seat 64, which occurs when substantially all of the acid solution in the metering chamber 40 has been withdrawn therefrom as shown in FIGURE 3. The floatable ball valve 60 also prevents the introduction of air into the passageway 38, the line 26 and the system during the regeneration cycle.

After the regeneration cycle has been completed, the service cycle is initiated again and the cycle of the acid dispenser 30 repeated. Accordingly, during each regeneration cycle the acid dispenser 30 will discharge to the line 26 substantially the same amount of acid solution, which, of course, is determined by the size of the metering chamber 40 and the floatable ball valve 60. In this manner, the acid dispenser 30 is adapted to dispense a predetermined amount of acid solution to the line 26 in the water softening system during each regeneration cycle. When the level of acid solution in the reservoir chamber 36 approaches the top of the metering chamber 40, additional acid solution must be added to the reservoir chamber 36, e.g., through the opening 35 in the top of the acid container 32.

The pressure of the treated water during the high pressure cycle of the line 26 is, of course, sufficiently large to move the valve means 52 from the position shown in FIGURE 2. The valve means 52 may be biased by a spring (not shown) to normally assume the position shown in FIGURE 3 and in that instance the pressure of the treated water against the valve closure member 56 would also have to be large enough to overcome the force of the spring. Similarly, the valve means 52 moves to its position shown in FIGURE 3 by virtue of the pressure differential between the passageway 38 and the passageway 46. The sizes of the valve closure members 56 and 58 may be varied to assure that the valve means 52 is in the desired positions during the regeneration and service cycles.

The acid container 32, the body member 42, the valve means 52, the vent tube 62 and the pipe 38 may be made of suitable metal or plastic material, the selection of the particular material to be employed being a matter of choice generally dependent upon the acid solution employed. The valve seat 64, the ports 48 and 50 and the valve closure members 56 and 58 may have sealing means, such as rubber O-rings or the like, associated therewith to prevent leakage when they are closed. The container 32, metering device 34 and the pipe 39 may be attached in the manner shown by welding or other suitable means.

Referring now to the FIGURES 4 and 5, there is illustrated a modified acid dispenser embodying the features of the present invention and indicated generally by reference numeral 100. The acid dispenser 100 is adapted to dispense a predetermined amount of acid solution to the line 26 and the resin tank 16 during the regeneration cycle. To these ends, the acid dispenser 100 comprises a main body member 102 forming an acid reservoir chamber 104, a metering chamber 106 and a pressure chamber 110. The main body member 102 is attached to the line 26 by suitable means (not shown) such as welding or the like, so that the pressure chamber 110 communicates with the line 26. The body member 102 has a pivotally mounted lid 101 adapted to open and close an opening 103 in the top of the body member 102. The reservoir chamber 104 contains a relatively large supply of a suitable aqueous acid solution, such as citric acid or the like and is positioned above the metering chamber 106. The reservoir chamber 104 communicates with the atmosphere through a vent passageway 105 in the lid 101. A passageway 108 in the main body member 102 connects the metering chamber 106 and the acid reservoir chamber 104 so that acid solution may pass from the reservoir chamber 104 to the metering chamber 106. A diaphragm member 112, made of flexible material such as rubber or the like, separates the metering chamber 106 from the pressure chamber 110 and is suitably mounted within the main body member 102. A passageway 114 through the diaphragm member 112 connects the pressure chamber 110 and the metering chamber 106 so that acid solution may pass from the metering chamber 106 to the pressure chamber 110 and the line 26 as would be more apparent hereinafter.

A valve means indicated generally by reference numeral 116 is attached to the diaphragm member 112 by suitable means (not shown). The valve means 116 includes a hollow tubular portion 118 with a floatable ball valve 120 therein. The hollow tubular portion 118 communicates with the passageway 114 and has a plurality of holes 122. In this manner, the interior of the tubular portion 118 will receive acid solution supplied from the reservoir chamber 104. The floatable ball valve 120 rises with the level of the acid solution in the metering chamber 106 and is adapted to open and close the passageway 114. The ball valve 120 will close the passageway 114 when the metering chamber 106 is substantially empty of acid solution. The hollow portion 118 guides the movement of the floatable ball valve 120.

Extending upwardly from the top of the hollow tubular portion 118 is a valve stem portion 126 having a threaded end to which is attached a valve closure member 128. The valve stem portion 126 is a rod-shaped member and the valve closure member 128 is an annular-shaped member having its central opening threaded for attachment to the valve stem portion 126. The valve closure member 128 opens and closes the passageway or port 108 and, to these ends, is adapted to cooperate with an annular valve seat 130 about the periphery of the passageway 108.

A vent tube 132, which is threadedly attached, or otherwise suitably secured, to the valve stem portion 126, communicates with the metering chamber 106 through a passageway 134 in the valve stem portion 126. The vent tube 132 extends upwardly to the top portion of the reservoir chamber 104 and vents air from the metering chamber 106 as acid solution fills the metering chamber 106.

Attached to the bottom of the rubber diaphragm member 112 is a second valve means indicated generally by reference numeral 140. The valve means 140 is adapted to open and close the passageway 114 and, to these ends, includes a cup-shaped member 141 attached to the diaphragm member 112 by suitable means (not shown) and located in the pressure chamber 110. The cup-shaped member 141 has a ball valve 142 therein biased by a spring means 144. The ball valve 142 is adapted to open and close the passageway 114 in the pressure chamber 110 and is biased so as to close the passageway 114 in its normal position. The cup-shaped member 141 has a plurality of holes or passageways 146 whereby the pressure chamber 110 communicates with the interior of the cup-shaped member 141 and the passageway 114 in the rubber diaphragm member 112. The diaphragm member 112 is adapted to move upwardly and downwardly in response to the pressure in the pressure chamber 110. In this instance, although not required, the exterior portion of the diaphragm member 112 is biased by a spring 136 which abuts an annular flange 138 of the body member 102. In this manner, the valve means 140 does not move when the inner portion of the diaphragm member 112 flexes to move the valve means 116 upwardly to open the port 108, as shown in FIGURE 4. In its non-flexed position, as shown in FIGURE 5, the valve means 116 and the valve closure member 128 thereof close the port 108.

Assuming that the water softening system is in its service cycle, the line 26 will be placed under a high pressure by virtue of the treated water therein. The treated water under high pressure will pass into the pressure chamber 110 causing the ball valve 142 to seat on the rubber diaphragm 112 and close the passageway 114. By virtue of the pressure differential between the pressure chamber 110 and the metering chamber 106, the rubber diaphragm 112 will be flexed upwardly thereby moving the valve means 116 upwardly until the valve closure member 128 opens the passageway 108, as shown in FIGURE 4. Acid solution will flow by gravity from the reservoir chamber 104 through the passageway 108 into the metering chamber 106, the floatable ball valve 120 rising with the level of the acid solution until it hits the top of the tubular portion 118 of the valve member 116. The flow of acid solution from the reservoir chamber 104 to the metering chamber 106 will continue until the reservoir chamber 106 has been entirely filled with acid solution. In addition, acid solution will pass into the passageway 134 and fill the vent tube 132 until it has attained the level of the acid solution in the reservoir chamber 104. The acid dispenser 100 is now ready to dispense a predetermined amount of acid solution to the line 26 and the resin tank 16.

When the resin particles are ready for regeneration, the regeneration cycle is initiated and the line 26 placed under a partial vacuum or low pressure as described hereinbefore. Accordingly, the pressure chamber 110 is likewise placed under a partial vacuum or low pressure. By virtue of the pressure differential between the pressure chamber 110 and the metering chamber 106 and reservoir chamber 104, the diaphragm 112 moves downwardly until the valve closure member 128 engages the valve seat 130, as shown in FIGURE 5. In addition, the pressure differential causes the ball valve 142 to unseat from the passageway 114 and acid solution to pass from the metering chamber 106 through the passage 114, the holes 146 of the cup member 144 and the pressure chamber 110 to the line 26. The flow of acid solution continues until substantially all of the acid solution in the metering chamber 106, including the acid solution in the passageway 134 and the vent tube 132, has been discharged from the metering chamber 106 and the floatable ball valve 120 seats upon the diaphragm 112 and closes off the passageway 114. In this manner, the ball valve 120 prevents air from entering the line 26 during the regeneration cycle.

After the regeneration cycle has been completed, the service cycle is initiated again and the cycle of the acid dispenser 100 repeated. Accordingly, during each regeneration cycle the acid dispenser 100 will discharge to the line 26 substantially the same amount of acid solution, which, of course, is determined principally by the size of the metering chamber 106. In this manner, the acid dispenser 100 is adapted to dispense a predetermined amount of acid solution to the line 26 in the water softening system during each regeneration cycle. Acid solution is added to the reservoir chamber 104, e.g., through the opening 103 in the top of the reservoir chamber 104, when required to replenish the supply used during the regeneration cycles.

The body member 102, the valve means 116, the valve means 140 and the vent tube 132 may be made of suitable metal or plastic material, the selection of the particular material to be employed being a matter of choice and generally dependent upon the acid solution employed. The valve seat 130, the passageway 114 and the valve closure member 128 may have sealing means, such as rubber O-rings or the like, associated therewith to prevent leakage when they are closed. By altering the piping from the aspirator valve 20, the dispensers 30 and 100 may be used to contact the resin particles simultaneously with acid solution and brine solution. In such instances, the acid solution and brine solution are mixed in the aspirator valve 20 or in a line connected thereto as the acid solution and brine solution travel to the resin 16. Though the dispensers 30 and 100 have been discussed in detail with respect to dispensing acid solutions, they may be used to dispense any liquid by constructing their parts of suitable material.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A liquid dispenser comprising means forming a reservoir chamber, a metering chamber and a pressure chamber, said reservoir chamber being adapted to store liquid above said metering chamber, said pressure chamber communicating with a line to which liquid is to be dispensed, said line communicating with means causing low pressure and high pressure in said line, said reservoir chamber communicating with said metering chamber through a first passageway, said metering chamber and said pressure chamber being separated by a diaphragm means having a second passageway therein, a first valve means attached to said diaphragm means to open and close said first passageway, and a second valve means for opening and closing said second passageway, said second valve means coacting with said means causing low pressure and high pressure, for opening said second passageway when said line is under low pressure and for closing said second passageway when said line is under high pressure.

2. The liquid dispenser of claim 1 wherein said first valve means has a hollow tubular portion attached to said diaphragm means, said hollow tubular portion having a floatable ball valve therein, said floatable ball valve closing said second passageway when said metering chamber is substantially without liquid.

3. The liquid dispenser of claim 1 including a vent tube means connected to said first valve means and communicating with said metering chamber for removing air displaced from said metering chamber as liquid flows into said metering chamber from said reservoir chamber.

4. The liquid dispenser of claim 1 wherein said second valve means includes a spring-biased valve member which normally closes said second passageway, the pressure differential between said metering chamber and said pressure chamber opening said spring-biased valve member when said line is under low pressure.

5. A liquid dispenser comprising means forming a reservoir chamber, a metering chamber, and a pressure chamber, said reservoir chamber storing liquid above said metering chamber, said reservoir chamber and said metering chamber communicating through a first passageway having a first valve seat associated therewith, said first valve seat being in said reservoir chamber, said metering chamber and said pressure chamber being separated by a diaphragm means, said diaphragm means being made of flexible material and having a second passageway therethrough connecting said metering chamber and said pressure chamber, a first valve means connected to said diaphragm means and extending upwardly into said metering chamber and said reservoir chamber, said first valve means having a tubular portion connected to said diaphragm means, said tubular portion having a plurality of holes therethrough, said tubular portion having an interior communicating directly with said second passageway, a floatable valve means in said interior of said tubular portion, said floatable valve means being adapted to close said second passageway when said metering chamber is substantially empty of liquid, a valve stem portion attached to said tubular portion extending upwardly through said first passageway, said valve stem portion having a valve closure member attached thereto, said valve closure means being in said reservoir chamber and opening and closing said first passageway by cooperating with said first valve seat, vent tube means connected to said valve stem portion, said vent tube means extending upwardly into said reservoir chamber, said valve stem portion having a passageway communicating with said vent tube means whereby air is displaced from said metering chamber as said metering chamber is being filled with liquid, a second valve means attached to said diaphragm means and being located in said pressure chamber, said second valve means including a cup-shaped member attached to said diaphragm means, a spring biased valve member in said cup-shaped member, said spring-biased valve member being biased to close said second passageway, said cup-shaped member having a plurality of holes therein, said pressure chamber being connected to a line communicating with means causing low pressure and high pressure in said line, high pressure in said line actuating said diaphragm means to move said first valve means upwardly to open said first passageway whereby liquid passes from said reservoir chamber to said metering chamber, and low pressure in said line causing said diaphragm means to move downwardly and said valve closure member to close said first passageway and said spring-biased valve member to open said second passageway whereby liquid in said metering chamber is passed through said second passageway to said pressure chamber and said line.

6. A liquid dispenser comprising:

(I) means forming a reservoir chamber for a liquid and a metering chamber within said reservoir chamber, said liquid in said reservoir chamber being above said metering chamber, said reservoir chamber and said metering chamber communicating through a passageway, said passageway also communicating with a line to which said liquid is dispensed, means causing low pressure in said line and high pressure in said line;

(II) a valve in said passageway comprising:

(A) a stem with first closure means at one of its ends and second closure means at its opposite end, (B) a first port communicating with said line and a second port communicating with said reservoir chamber, (C) said first closure means mating with said first port and said second closure means mating with said second port, and (D) said valve having a first position in which said first closure means is spaced from said first port and said second closure means contacts said second port, whereby said passageway communicates with said line but is prevented from communicating with said reservoir chamber, and a second position in which said first closure means contacts said first port and said second closure means is spaced from said second port, whereby said passageway communicates with said reservoir chamber but is prevented from communicating with said line, said valve being actuated by high pressure in said line to said second position, whereby liquid enters said metering chamber from said reservoir chamber, and said valve being actuated by low pressure in said line to said first position, whereby liquid passes from said metering chamber to said line;

(III) a vent tube extending from the top of said metering chamber into said reservoir chamber to vent air displaced from said metering chamber by liquid leaving said reservoir chamber; and (IV) a floatable valve member in said metering chamber for closing said vent tube when said metering chamber is substantially full of liquid and for preventing said metering chamber from communicating with said first passageway when said metering chamber is substantially without liquid.

References Cited by the Examiner

UNITED STATES PATENTS

| 1,611,422 | 12/1926 | Duden | 210—190 X |
| 2,304,661 | 12/1942 | Shoemaker | 210—191 X |
| 2,408,156 | 9/1946 | Titus | 222—442 |
| 2,565,045 | 8/1951 | Ray | 222—444 X |
| 2,578,994 | 12/1951 | Dunaway | 222—442 X |
| 2,838,208 | 6/1958 | Levit | 222—504 X |
| 3,071,150 | 1/1963 | Whitlock | 137—391 |
| 3,176,876 | 4/1965 | Fischer et al. | 222—440 X |
| 3,194,434 | 7/1965 | Evanson | 222—444 |
| 3,197,088 | 7/1965 | McKenzie | 222—453 |
| 3,203,602 | 8/1965 | Kryzer. | |
| 3,216,931 | 11/1965 | Dennis et al. | 210—191 X |

FOREIGN PATENTS 325,240  2/1930  Great Britain.

REUBEN FRIEDMAN, *Primary Examiner.*

C. M. DITLOW, *Assistant Examiner.*